(12) United States Patent
Greer et al.

(10) Patent No.: US 7,305,274 B2
(45) Date of Patent: Dec. 4, 2007

(54) SYSTEM AND METHOD FOR DRAWING AND MANUFACTURING BENT PIPES

(75) Inventors: Gary L. Greer, Lewisville, TX (US); John D. Mack, San Carlos, CA (US)

(73) Assignee: GCC, Inc., San Jose, CA (US)

( * ) Notice: Subject to any disclaimer, the term of this patent is extended or adjusted under 35 U.S.C. 154(b) by 586 days.

(21) Appl. No.: 10/864,789

(22) Filed: Jun. 9, 2004

(65) Prior Publication Data

US 2004/0225392 A1    Nov. 11, 2004

Related U.S. Application Data

(63) Continuation of application No. 10/072,664, filed on Feb. 5, 2002, now Pat. No. 6,757,576.

(51) Int. Cl.
*G06F 19/00* (2006.01)

(52) U.S. Cl. ............ 700/97; 700/117; 700/160; 700/182; 703/1; 706/9

(58) Field of Classification Search ........... 700/86, 700/97, 103, 104, 117, 160, 182; 703/1; 706/9, 19
See application file for complete search history.

(56) References Cited

U.S. PATENT DOCUMENTS

| | | | |
|---|---|---|---|
| 3,145,756 A | | 8/1964 | Hill .............................. 72/16.2 |
| 4,947,666 A | * | 8/1990 | Hametner et al. .............. 72/37 |
| 5,517,428 A | * | 5/1996 | Williams ........................ 703/1 |
| 5,768,149 A | * | 6/1998 | Umney et al. .................. 703/1 |
| 6,230,066 B1 | * | 5/2001 | Sferro et al. ................. 700/104 |
| 6,757,576 B2 | * | 6/2004 | Greer et al. .................. 700/97 |

FOREIGN PATENT DOCUMENTS

| | | |
|---|---|---|
| EP | 0789289 A2 | 8/1997 |
| EP | 0985992 A2 | 3/2000 |
| WO | WO91/013706 A | 9/1991 |

OTHER PUBLICATIONS

"Machine Design", Penton Media, Cleveland, OH vol. 1, No. 49, Jan. 1977, p. 42.

* cited by examiner

*Primary Examiner*—Leo Picard
*Assistant Examiner*—Douglas S Lee
(74) *Attorney, Agent, or Firm*—Henneman & Associates, PLC; Larry E. Henneman, Jr.

(57) ABSTRACT

Novel systems and methods of using a bent-tube object in a drawing file include entering a custom bent-tube object in a drawing file, and using the bent tube object to generate bender driver data. In a particular method, the step of entering the custom bent-tube object in the drawing file includes entering a multi-segmented line, and generating the custom bent-tube object based at least in part on the lengths of and angles between the segments of the multi-segmented line. In a more particular method, the step of entering the custom bent-tube object further includes selecting a tube type (e.g., a particular diameter, material, etc.), and the step of generating the custom bent-tube object further includes retrieving bent-tube object data from an object data file based at least in part on the tube type.

39 Claims, 7 Drawing Sheets

| Bent-Tube Object File | | | | | | | | | | | |
|---|---|---|---|---|---|---|---|---|---|---|---|
| Size | ID | R | EC1 | EC2 | PN | CAN1 | CFD1 | CLL1 | FSBK | PSBK | TELO |
| 0.50 | 0.435 | 2 | BW-1 | BW-1 | - | 45 | 2 | 2 | 0.3 | 2 | 1.5 |
| 0.75 | 0.685 | 2 | BW-1 | BW-1 | - | 45 | 2 | 2 | 0.3 | 2 | 1.5 |
| 1.00 | 0.935 | 2 | BW-1 | BW-1 | - | 45 | 2 | 2 | 0.3 | 2 | 1.5 |
| 1.50 | 1.435 | 2 | BW-1 | BW-1 | - | 45 | 2 | 2 | 0.3 | 2 | 1.5 |
| 2.00 | 1.935 | 2 | BW-1 | BW-1 | - | 45 | 2 | 2 | 0.3 | 2 | 1.5 |
| 2.50 | 2.435 | 2 | BW-1 | BW-1 | - | 45 | 2 | 2 | 0.3 | 2 | 1.5 |
| 3.00 | 2.935 | 2 | BW-1 | BW-1 | - | 45 | 2 | 2 | 0.3 | 2 | 1.5 |
| 4.00 | 3.935 | 2 | BW-1 | BW-1 | - | 45 | 2 | 2 | 0.3 | 2 | 1.5 |
| 5.00 | 4.935 | 2 | BW-1 | BW-1 | - | 45 | 2 | 2 | 0.3 | 2 | 1.5 |
| 6.00 | 5.935 | 2 | BW-1 | BW-1 | - | 45 | 2 | 2 | 0.3 | 2 | 1.5 |
| 8.00 | 7.935 | 2 | BW-1 | BW-1 | - | 45 | 2 | 2 | 0.3 | 2 | 1.5 |

| Bent-Tube Object File (continued) | | | | | | | | | | | |
|---|---|---|---|---|---|---|---|---|---|---|---|
| CRTL | CIN1 | F2L1 | F1L1 | TLDP | SMV1 | SMV2 | SMV3 | SM18 | SM19 | SM20 | SPV1 |
| 0.01 | 9.2 | 9 | 9 | 11 | 9 | 1 | 200 | 380 | 150 | 250 | 0 |
| 0.01 | 9.2 | 9 | 9 | 11 | 9 | 1 | 200 | 380 | 150 | 250 | 0 |
| 0.01 | 9.2 | 9 | 9 | 11 | 9 | 1 | 200 | 380 | 150 | 250 | 0 |
| 0.01 | 9.2 | 9 | 9 | 11 | 9 | 1 | 200 | 380 | 150 | 250 | 0 |
| 0.01 | 9.2 | 9 | 9 | 11 | 9 | 1 | 200 | 380 | 150 | 250 | 0 |
| 0.01 | 9.2 | 9 | 9 | 11 | 9 | 1 | 200 | 380 | 150 | 250 | 0 |
| 0.01 | 9.2 | 9 | 9 | 11 | 9 | 1 | 200 | 380 | 150 | 250 | 0 |
| 0.01 | 9.2 | 9 | 9 | 11 | 9 | 1 | 200 | 380 | 150 | 250 | 0 |
| 0.01 | 9.2 | 9 | 9 | 11 | 9 | 1 | 200 | 380 | 150 | 250 | 0 |
| 0.01 | 9.2 | 9 | 9 | 11 | 9 | 1 | 200 | 380 | 150 | 250 | 0 |
| 0.01 | 9.2 | 9 | 9 | 11 | 9 | 1 | 200 | 380 | 150 | 250 | 0 |

FIG. 3B

| $pnum (value) | | | | 502 |
| --- | --- | --- | --- | --- |
| $unit (value) | | | | 504 |
| $clra (value) | | | | 506 |
| Length to Beginning of First Bend | Rotation to First Bend | Angle of First Bend | Radius of First Bend | |
| Length to Beginning of Next Bend | Rotation to Next Bend | Angle of Next Bend | Radius of Next Bend | |
| ⋮ 518 | ⋮ 520 | ⋮ 522 | ⋮ 524 | |
| Length to Beginning of Last Bend | Rotation to Last Bend | Angle of Last Bend | Radius of Last Bend | |

508

| $pvar 11 | | 510 |
| --- | --- | --- |
| TBDI | 1.0000 | |
| AEDI | 1.0000 | |
| BEDI | 1.0000 | |
| PRBR | 2.0000 | |
| TUBL | 12.0000 | |
| FSBK | 0.3000 | 512 |
| PSBK | 2.0000 | |
| TELO | 1.5000 | |
| CRTL | 0.0100 | |
| TLDP | 11.0000 | |
| SPV1 | 0.0000 | |
| $mvar 12 | | 514 |
| CAN1 | 45.0000 | |
| CFD1 | 2.0000 | |
| CLL1 | 2.0000 | |
| CIN1 | 9.2000 | |
| F2L1 | 9.0000 | |
| F1L1 | 9.0000 | 516 |
| SMV1 | 9.0000 | |
| SMV2 | 1.0000 | |
| SMV3 | 200.0000 | |
| SM18 | 380.0000 | |
| SM19 | 150.0000 | |
| SM20 | 250.0000 | |

SYSTEM AND METHOD FOR DRAWING AND MANUFACTURING BENT PIPES

RELATED APPLICATIONS

This application is a continuation of U.S. patent application Ser. No. 10/072,664 (now issued as U.S. Pat. No. 6,757,576), filed Feb. 5, 2002 by the same inventors, which is incorporated herein by reference in its entirety.

BACKGROUND OF THE INVENTION

1. Field of the Invention

This invention relates generally to the design and manufacturing of piping and plumbing systems, and more particularly to a system and method for designing and manufacturing systems including bent tubing. Even more particularly the present invention relates to a system and method for entering a bent-tube object in a CAD drawing file, and for using the bent-tube object to generate data for driving a tube bender to manufacture a bent tube.

2. Description of the Background Art

Computer assisted design (CAD) systems are well known and widely used in the design of mechanical devices, architectural structures, landscaping, and the like. Known systems (e.g., AutoCAD) allow the designer to enter objects into an electronic drawing file in order to "draw" the device, structure, etc. being designed.

While some CAD programs appear quite complex, and offer the designer a great variety of drawing tools, such programs are essentially only drawing engines. The objects in the drawing files are only arcs, circles, lines, etc. While the arcs, circles, and lines can be grouped to provide the appearance of an object (e.g., a 90° pipe elbow), the object is still only a group of arcs, circles, lines, etc. The CAD program does not recognize the object as an entity having any real physical characteristics (e.g., material type, function, etc.).

Plug-in programs have been developed to work with CAD systems to provide additional information about an object in a drawing file. For example, a plug-in program might provide a list of objects that can be entered into a drawing file. Objects provided by plug-in applications typically include data (e.g., material type, end connection conditions, pressure ratings, etc.) in addition to the drawing data, which can be selectively retrieved by the designer.

Known plug-in applications are limited to standard objects that are used repeatedly in systems being designed. For example, components such as elbows, tees, valves, etc. are used repeatedly in various systems without any change to the component itself. Further, such components are typically available as a commodity from suppliers. It is, therefore, efficient to provide such standard objects in a plug-in application.

Some objects, however, necessarily vary from one design to the next. It is not, therefore, efficient to spend the resources necessary to offer such custom objects in a plug-in application, because a custom object designed for one system might never be used in another system.

Bent tubes/pipes are an example of objects not previously offered in plug-in applications. The dimensions and parameters of a bent tube are highly dependent on the specific architecture of an individual project. The number and angle of bends formed in the tube are generally dictated by the physical layout of the project, which varies on a case-by-case basis. Thus, bent tubes are custom objects that are not offered in prior art plug-in applications.

Further, bent tubes for each project or even each piece must be custom made on the fly. The manufacture of such bent tubes requires a user to manually input data into a controller that in turn drives a tube bender to form the bent tube. The operator is required to glean the required information (e.g., bent-tube dimensions) from an engineering drawing printout, modify and/or augment the information based on the type of bender being used, and manually input the data into the controller. This process is very time consuming, and is highly susceptible to operator error.

What is needed, therefore, is a system and method that allows a designer to enter a custom bent-tube object in an electronic drawing file. What is also needed is a system and method to include bender driver data in a custom bent-tube object. What is also needed is a system and method for automatically extracting and/or using information from the bent-tube object to drive a tube bender.

SUMMARY

The present invention overcomes the problems associated with the prior art by providing a system and method for entering a custom bent-tube object in a drawing file, and then using the custom bent-tube object to generate bender driver data. The bender driver data can then be used to drive a bending machine to bend a tube to form a custom bent tube corresponding to the custom bent-tube object in the drawing.

One method includes entering a custom bent-tube object in a drawing file and using the bent tube object to generate bender driver data. In a particular method, the step of entering the custom bent-tube object in the drawing file includes entering a multi-segmented line in the drawing file, and generating the custom bent-tube object based at least in part on the lengths of and angles between the segments of the multi-segmented line. In a more particular method, the step of entering the custom bent-tube object further includes selecting a tube type (e.g., a particular diameter, material, etc.), and the step of generating the custom bent-tube object further includes retrieving bent-tube object data from an object data file based at least in part on the tube type. Optionally, the bent-tube object data retrieval is further based on a particular type of tube bending machine.

One method of using the custom bent-tube object to generate bender driver data includes extracting at least a portion of the driver data from the custom bent-tube object. In one particular method, all of the bender driver data is extracted from the custom bent-tube object. Alternatively, a portion of the bender driver data can be retrieved from a separate bender driver data file. Optionally, a portion of the bender driver data is retrieved based at least in part on a user selected bender type. Further, the bender driver data can optionally be converted from data for driving a first type of tube bender to data for driving a second type of tube bender.

The bender driver data can be communicated to a tube bender in various ways. In one example, the driver data is extracted from the drawing file, and the bender driver data is then transferred to the bending machine via a removable media, a network connection, or some other data transfer method. In an alternative example, the drawing file itself is provided to the bender controller, and the bender controller extracts the driver data from the custom bent-tube object.

The invention can also be embodied in an electronically readable media having code embodied therein for causing an electronic device to facilitate any or all of the methods disclosed herein. Examples of electronically readable media include, but are not limited to: removable media devices such as magnetic or optical disks; local or remote hard disks;

memory devices including random access, read only, and cache memory; and any other device capable of storing digital data, whether now known or later developed.

Systems for using a bent-tube object in a drawing file are also described. One system includes an object manager responsive to input from a user and operative to generate a bent-tube object, and a drawing engine responsive to the object manager and operative to enter the bent-tube object in a drawing file. In a particular embodiment, the object manager is further responsive to a user selected tube type in generating the bent-tube object. The object manager retrieves bent-tube object data based at least in part on the selected tube type. The selected tube type optionally depends on a desired diameter of the tube.

An extraction module is operative to generate/extract bender driver data from the custom bent-tube object. In a particular embodiment, the extraction module generates a portion of the bender driver data from the custom bent-tube object, and retrieves another portion of the bender driver data from a separate data file. Alternatively, the extraction module generates/retrieves substantially all of the bender driver data from the custom bent-tube object. Optionally, a data converter, responsive to indicia of a particular bender type, converts bender driver data for a first type of bender to bender driver data for a second type of bender.

Various data structures for implementing the present invention are also disclosed. One data structure includes a first field containing data representing a graphical image of a bent tube, a second field containing data representing a type of tube to be bent to form the bent tube, and a third field containing data for driving a tube bender to bend said bent tube. Alternatively, the third field contains a link to a data file containing data for driving a tube bender.

A particular data structure further includes a fourth field containing data representing the length of a first line segment, a fifth field containing data representing the length of a second line segment, and a sixth field containing data representing an angle between the first line segment and the second line segment. In a more particular data structure, the sixth field contains a first sub-field containing data representing an absolute angle of the first line segment, and a second sub-field containing data representing an absolute angle of the second line segment.

BRIEF DESCRIPTION OF THE DRAWINGS

The present invention is described with reference to the following drawings, wherein like reference numbers denote substantially similar elements:

FIG. 3A shows a first half of an example data structure for a bent-tube object file;

FIG. 3B shows a second half of the example data structure of the bent-tube object file of FIG. 3A;

FIG. 5 shows an example data structure for bender driver data generated/extracted according to one embodiment of the present invention;

DETAILED DESCRIPTION

The present invention overcomes the problems associated with the prior art, by providing a system and method for entering a custom bent-tube object in a drawing file, and for using said bent-tube object to generate bender driver data. In the following description, numerous specific details are set forth (e.g., drawing engine, bender machine type, etc.) in order to provide a thorough understanding of the invention. Those skilled in the art will recognize, however, that the invention may be practiced apart from these specific details. In other instances, details of well known CAD system and manufacturing practices and components have been omitted, so as not to unnecessarily obscure the present invention.

Figure 1:
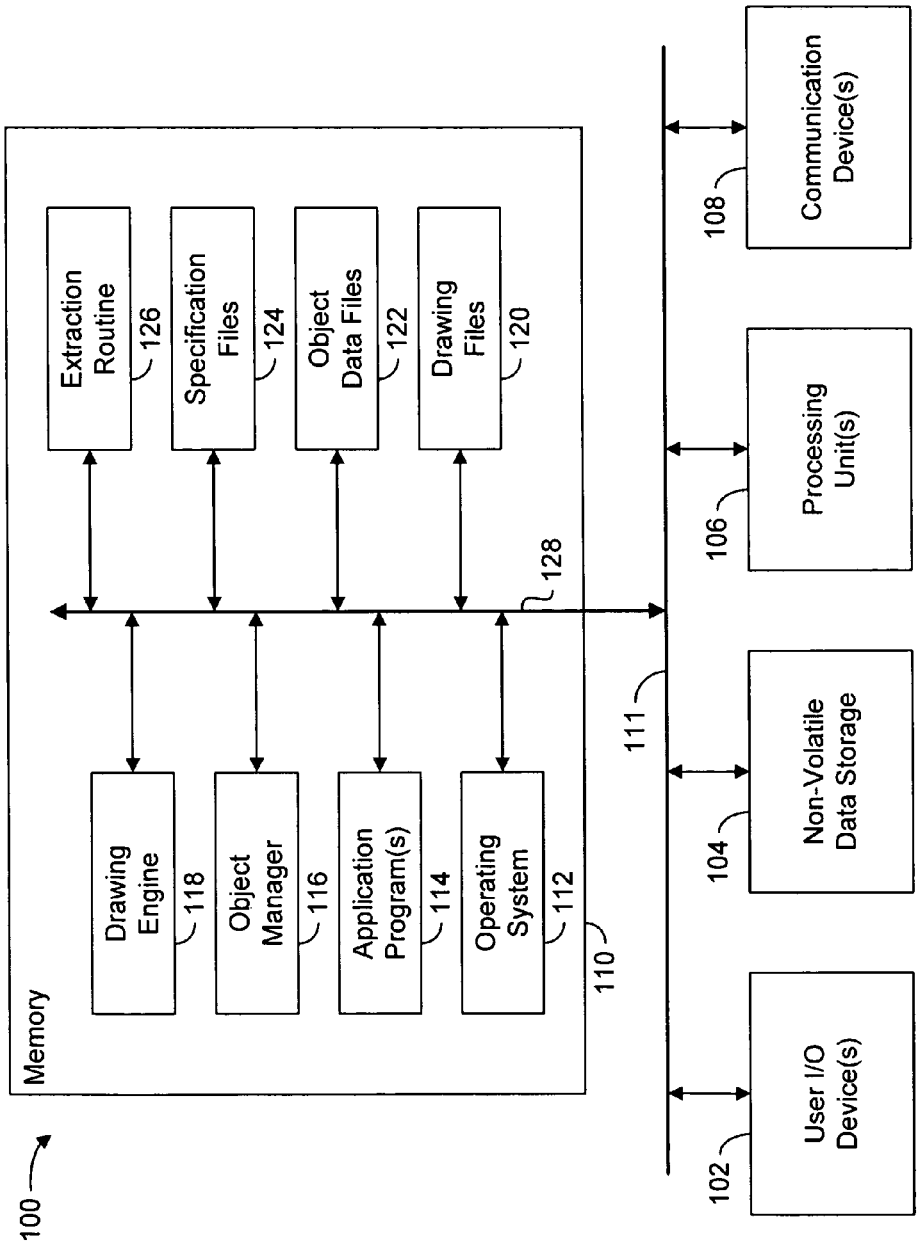
FIG. 1 is a block diagram of a general purpose computer hosting one embodiment of the present invention.

FIG. 1 is a block diagram of a design system 100 according to one embodiment of the present invention. System 100 includes user I/O devices 102, nonvolatile memory 104, processing unit(s) 106, communication devices 108, and working memory 110, all intercommunicating via internal bus 111 (e.g., PCI bus). User I/O devices 102 (e.g., keyboard, mouse, monitor, etc.) provide a means for user/designer interaction with system 100. Nonvolatile memory 104 (e.g., ROM, PROM, EPROM, etc.) stores basic code necessary to boot system 100, and retains the boot code even when system 100 is powered down. Nonvolatile memory 104 further provides mass data storage (e.g., local hard disk(s), removable media, etc.) for client data, application programs, an operating system, etc. This data and code is also retained when system 100 is powered down. Processing unit 106 imparts functionality to system 100 by executing code stored in nonvolatile memory 104 and/or working memory 110. Communication device(s) 108 (e.g., modem, network adapter, etc.) provides an interface to facilitate communication between system 100 and other systems (e.g., network clients, tube bending machines, etc.).

Working memory 110 (e.g., SRAM, DRAM, etc.) provides random access memory for use by processing unit 106, and includes an operating system (OS) 112, application programs 114, an object manager 116, a drawing engine 118, drawing data 120, object data 122, specification data 124, and an extraction routine 126, all of which are transferred into working memory 110 from non-volatile data storage 104 or some other computer readable media (e.g., an optical disk, a floppy disk, or any other media, local or remote, capable of storing computer code). Operating system 112 (e.g., LINNUX®, WINDOWS NT®, UNIX®, etc.) is a low level program on top of which other programs run. Application programs 114 include higher level applications (e.g., word processors, e-mail servers, network maintenance programs, etc.) that provide useful functionality to server 102, apart from the design/manufacturing functions of the present invention. However, it is contemplated that application programs 114 may interact with the design components of the present invention to complement the functionality thereof.

While object manager 116, drawing engine 118, drawing data 120, object data 122, specification data 124, and extraction routine 126 are shown as discrete functional blocks within working memory 110, it should be understood that these components consist of computer code that imparts functionality to system 100 when executed by processing unit 106. Of course, the code need not reside in any particular memory location. In fact, much of the code may reside outside of memory 110 (e.g., in non-volatile data storage 104), with portions of the code being transferred into and out of memory 110 as necessary for execution by processing unit 106. Further, the functionality of the components need not be segregated as shown in memory 110. It is helpful, however, for purposes of explanation, to consider the components as functional blocks operating within memory 110, and communicating with the other components of system 100 via a memory bus 128 and internal bus 111.

Object manager 116 and drawing engine 118 work together to enter objects, including custom bent-tube objects, in drawing files 120, and to display the objects and their associated data to a designer. Specification data files 124 provide lists of objects which can be selected by a designer for insertion into a drawing file 120. Object data files 122 include specific information. about each object listed in specification data files 124. Extraction routine 126 extracts/generates tube bender driver data from custom bent-tube objects entered in drawing files 120.

Figure 2:
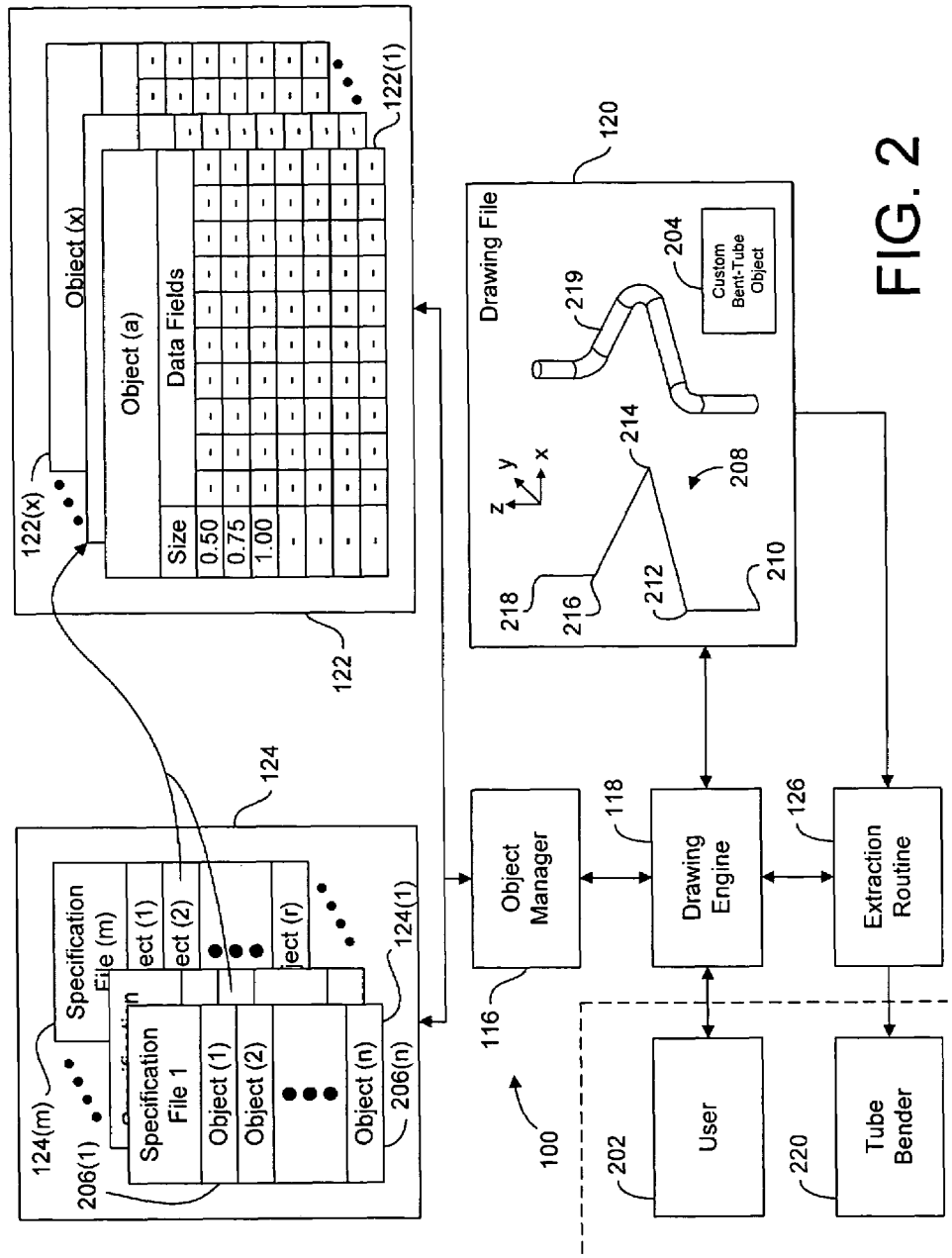
FIG. 2 is a block diagram illustrating the functional relationship between various components shown in FIG. 1.

FIG. 2 is a block diagram showing the functional inter-relationship between object manager 116, drawing engine 118, drawing data 120, object data 122, specification data 124, and extraction routine 126. A user 202 interacts with system 100 via user I/O devices 102 (FIG. 1) and drawing engine 118. Drawing engine 118 is similar to conventional drawing engines (e.g., AutoCAD® that allow a user to enter conventional drawing elements (lines, circles, arcs, etc) in drawing file 120. Object manager 116 is a plug-in application that facilitates the entry of custom bent-tube object 204, as well as standard objects, in drawing file 120. It should be understood, however, that object manager 116 need not be implemented as a plug-in, but could, for example, be integrated with drawing engine 118.

User 202 can enter a custom bent-tube object 204 in drawing file 120 as follows. When drawing engine 118 opens drawing file 120 for revision, object manager 116 presents user 202 (via drawing engine 118) with a list of specification files 124(1-m), from which the user can choose. Each specification file 124 corresponds to a particular design task (e.g., hot water plumbing, cold water plumbing, steam lines, ventilation, electrical, mechanical, etc.), and includes a list of available objects 206(1-n, r, . . . ) suited to the particular design task. For example, a specification for a cold water system might include 90° copper elbows, 45° copper elbows, brass gate valves, etc., whereas a specification for a drain system might include 90° plastic elbows, 45° plastic elbows, plastic "Y"s, etc. Note that each specification file can include a different number of available objects 206(1-n, r, etc.).

Each object 206 corresponds to one of object data files 122(1-x). In this particular embodiment, each object record 206 includes a description sufficient for the user to identify the represented object, and a link or pointer to an associated object data file 122. Note that the same object 206 can be included in more than one specification files 124, such that there is a many-to-one relationship between objects 206 and object data files 122.

Object data files 122 include a plurality of data fields, each associated with a particular size of the selected object. Example data fields for a 90° elbow include, but are not limited to, inside diameter(ID), a first end condition (EC1), a second end condition (EC2), pressure rating, etc. The types of data fields included in an object data file 122 depend on the type of object to which the data file corresponds and the information about that object that would be useful to a designer. For example, electrical parts would have different data fields (e.g., contact conditions, resistance, etc.) than plumbing parts. In the case of a bent-tube object file 122, additional data fields include bender driver data, as will be more fully described below.

In this particular embodiment of the invention, each object record 206 is organized according to nominal pipe size. However, those skilled in the art will recognize that this particular element (as well as other described elements, even if not explicitly stated) is not an essential element of the present invention. For example, the present invention may be practiced by organizing object data files according to some other index such as ID, EC1, EC2, or any other useful characteristic.

Having selected a specification file 124 including a bent-tube object, having selected the bent-tube object 206, and having selected the nominal pipe size for the bent-tube object, user 202 can enter custom bent-tube object 204 in drawing file 120 by inputting a multi-segmented line 208 along the desired path of the bent-tube object. Multi-segmented line 208 can be entered by user 202 in a number of ways. For example, the user may sequentially click a pointing device (e.g., a computer mouse, electronic pen, etc.) at points 210, 212, 214, 216, and 218. Alternatively, the user can enter multi-segmented line 208 via a keyboard by, for example, inputting the coordinates of each of points 210, 212, 214, 216, and 218. Indeed, virtually any method or means, now known or later developed, for entering points in a drawing file could be used to input points 210, 212, 214, 216, and 218. For example, a routing routine could be employed to route multi-segmented line 208 between two other objects (not shown) previously placed in drawing file 120.

Once multi-segmented line 208 is entered, and an initiate signal (e.g., a double mouse click at last point 218) is provided by the user, object manager 116 retrieves the data corresponding to the selected pipe size from the object data file 122 corresponding to the selected bent-tube object 206. Object manager then uses the retrieved data, and the geometric parameters (e.g., segment lengths, angles, etc.) of multi-segmented line to generate custom bent-tube object 204. Thus, bent-tube object 204 includes both graphical data necessary for generating an image 219 of a bent-tube, and bender driver data that can be extracted by extraction routine 126 and used to drive tube bender 220 in order to manufacture the bent-tube. Because there are a variety of different tube benders available, extraction routine 126 includes the capability of converting the bender driver data from driver data for one type of bender to driver data for other types of benders by, for example, a simple mapping routine.

The bender driver data can be provided to tube bender 220 in a variety of ways. For example, the driver data can be transferred from extraction routine 126 to bender 220 via a network connection. As another example, the bender driver data can be written to a removable computer-readable media, which can be read by tube bender 220. As yet another example, tube bender 220 can include an extraction routine, whereby bender 220 can extract the bender data from the drawing file 120, which can be transferred to bender 220 via a network connection, a computer-readable media, etc.

Note that the order of selecting a specification, selecting a size, and entering a multi-segmented line is not an essential element of the present invention. For example, multi-segmented line 208 can be entered before an object 206 is selected.

FIGS. 3A and 3B show a more detailed view of a bent-tube object file 122(x). Bent-tube object file 122(x) includes the following fields. The "Size" field indicates the nominal pipe size of the tube. The "ID" field indicates the inside diameter of the tube. The "R" field indicates the bend radius of bends to be formed in the tube. The "EC1" field indicates the end condition (BW-1 means a butt weld) of the first end of the bent-tube. The "EC2" field indicates the end condition of the second end of the bent-tube. The "PN" field indicates an optional part number that can be assigned to a particular object.

The foregoing data fields are not unlike data fields that might be found in an object data file for an object such as a 90° elbow. The remaining data fields, however, provide variable parameters used to generate bender driver data, and should be familiar to a reasonably skilled tube bender operator. The "CAN1" variable is the "C" safe angle in degrees. The "CFD1" variable is the "Y" clearance in inches. The "CLL1" variable is the clamp length in inches. The "FSBK" variable is the fixed springback as a percent. The "PSBK" variable is the proportional springback as a percent. The "TELO" variable is the tube elongation as a percent. The "CRTL" variable is the collet release tolerance in inches. The "CIN1" variable is the "Y" minimum distance in inches. The "F2L1" variable is the interference zone 2 in inches. The "F1L1" variable is the interference zone 1 in inches. The "TLDP" variable is the load position in inches. The "SMV1" variable is the load offset in inches. The "SMV2" variable is the boost delay in degrees. The "SMV3" variable is the pressure die open code in pounds per square inch. The "SM18" variable is the pressure die assist in pounds per square inch. The "SM19" variable is the boost pressure in pounds per square inch. The "SM20" variable is the pressure die low pressure in pounds per square inch. The "SPV1" variable is an extra variable included to show that other variables can be included in bent-tube object file 122(x).

Although the variables in FIGS. 3A and 3B are shown to have the same values regardless of nominal pipe size, but this would not be the case in the actual implementation of the invention. The inventors have discovered that the variables set forth in bent-tube object file 122(x) work satisfactorily for a tube of 316L stainless steel having a nominal pipe size of one inch, and those values have been copied to the data fields for the other pipe sizes. In the implementation of the invention, the values of all of the variables for the various pipe sizes will be adjusted based on feedback from the bender operator regarding the quality of the finished bent tubes.

Figure 4:
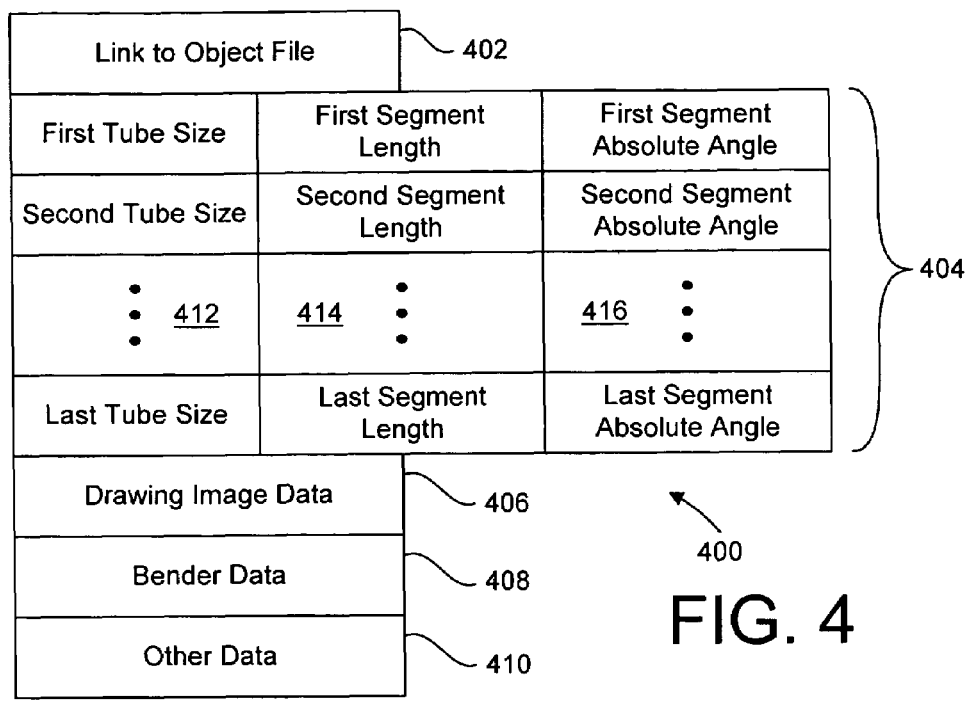
FIG. 4 shows an example data structure for custom bent-tube object.

FIG. 4 shows an example data structure 400 for custom bent-tube object 204. Data structure 400 includes a link field 402, a group 404 of fields relating to the geometry of multi-segmented line 208, a drawing image field 406, a bender data field 408, and an other data field 410.

Link field 402 includes a link to a corresponding one of object data files 122. This link reduces the amount of bender data 408 that must be stored in custom bent-tube object 204. In particular, extraction routine 126 can use link 402 to retrieve data from object data files 122, only when needed to generate bender driver data. In an alternative data structure (described below) link 402 is unnecessary, because all of the relevant bender driver data from the respective object data file 122(x) is stored in custom bent-tube object 204.

Group 404 includes a plurality of subgroups (shown in rows for clarity) of fields, each subgroup (row) corresponding to one segment of multi-segmented line 208. Accordingly, the number of subgroups depends on the number of segments in multi-segmented line 208. Each subgroup includes a tube size field 412, a segment length field 414, and segment absolute angle field 416.

Each tube size field 412 contains data indicative of the diameter of the tube. Each segment length field contains data indicative of the length of an associated segment of line 208. Each absolute angle field includes data indicative of the absolute angle of the associated line segment with respect to a predetermined set of coordinate axes.

Note that a separate tube size field 412 is provided for each segment, because the present invention may be configured to bend tubes having a varying diameter, for example tubes having a flared end. In such a case, the designer could indicate (e.g., by selecting a new tube size) the change in tube size while entering multi-segmented line 208. Optionally, the designer could invoke an algorithm to directly access and change fields 412 after custom bent-tube object 204 has been entered.

As used herein, the term "field" is understood to include a set of one or more data items. For example, each absolute angle field 416 may include, for example, two data items, one indicative of a polar angle, and one indicative of an azimuthal angle. Thus any field described herein may include several subfields, even if not explicitly described.

Drawing image data field 406 includes the data necessary to generate an image of bent-tube object 204, for example on a display screen or a printout. Bender data field 408 includes data necessary to generate bender driver data, and optionally includes data indicative of one of a plurality of bender machine types. As indicated above, if link 402 is used, the amount of data stored in bender data 408 can be greatly reduced. Other data field 410 is included to show that any other useful data can be included in custom bent-tube object 204, including but not limited to physical specifications, material, cost, source, availability, and so on.

FIG. 5 shows an example data structure 500 for tube bender driver data. This particular data structure is compatible with SUPRA VISIONS® software by MULTI-SYSTEM, INC. for driving a tube bender by EAGLE-EATON LEONARD®. It should be understood, however, that the present invention may be configured for use with any type of automated controller/bender.

Data structure 500 includes a "$pnum" field 502, a "$unit" field 504, a "$clra" field 506, a plurality 508 of fields relating to bending geometry, a "$pvar" field 510, a plurality 512 of process variables, a "$mvar" field 514, and a plurality 516 of machine variables. The $pnum field 502 includes a value that identifies the part being bent, typically by an electronic file name. The $unit field 504 includes a value that represents what type of bender the code is going to. The $clra field 506 marks the beginning of the geometric (length, rotation, and angle) data fields 508, and includes a value that represents machine movement values. Geometric data fields 508 include the actual length, angle and rotation values of the bent tube to be formed. The $pvar field 510 indicates the beginning of the process variables 512, and includes a value indicating the number of process variables to follow. Process variables 512 correspond to the variables of the same name described above with reference to FIGS. 3A and 3B. The $mvar field 514 indicates the beginning of the machine variables 516, and includes a value indicating the number of machine variables to follow. Machine variables 512 correspond to the variables of the same name described above with reference to FIGS. 3A and 3B.

Geometric data fields 508 are arranged in rows, with each row corresponding to one bend to be formed in the bent tube. Each row includes a length to beginning of bend field 518, a rotation to bend field 520, an angle of bend field 522, and a radius of bend field 524. The length to the beginning of bend value is calculated by subtracting the sum of length required to form the bends at both ends of a segment from the length of the associated line segment of line 208 (FIG. 2). The rotation and angle values are calculated by comparing the absolute angles 416 (FIG. 4) of the segments preceding and following a particular bend. In the case of the first bend, the rotation value should normally be zero. The bend radius value comes from the "R" variable in the bent-tube object file 122(*x*) (FIG. 3A), either directly or indirectly via bender data 408, depending on the particular implementation of the invention.

Referring now to FIGS. 4 and 5, data structure 400 can be modified to produce an alternate data structure for custom bent-tube object 204. In particular, most or all of the data contained in bender driver data 500 can be retrieved and/or generated from bent-tube object file 122(*x*) when custom bent-tube object is created and entered into drawing file 120. In that case, geometric data 508 replaces fields 404, which is then redundant. Further, bender data 408 would include machine variables 512 and process variables 516. In other words, the alternate custom bent-tube object would include substantially all of bender driver data 500, optionally in a form substantially similar to that required to drive a bending machine.

This alternate data structure has the advantage, that a stand-alone extraction routine (e.g., in a bender controller) can extract the necessary bender driver data from drawing file 120, without access to object data files 122. Of course, this benefit comes at the price of an increased file size for drawing file 120.

Figure 6:
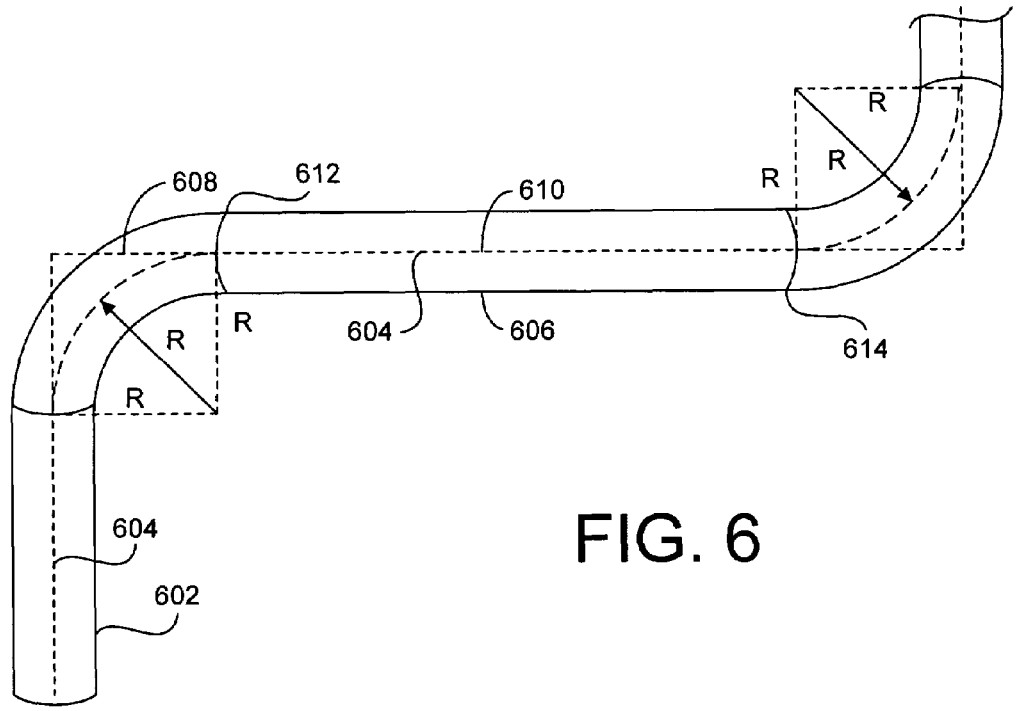
FIG. 6 shows an example of a bent tube having two bends formed therein.

FIG. 6 shows a bent tube 602 superimposed over a multi-segmented line 604, and helps to illustrate one example method of calculating the length to beginning of bend 518 value. As shown in FIG. 6, a middle segment 606 of the bent tube 602 has a 90° bend with a radius (R) formed at each end. From inspection of FIG. 6, it is clear that a 90° bend consumes a length of each line segment equal to the bend radius (R). For example, assume pipe 602 has a 1 in. diameter, and the bend radius (R) is twice the diameter of the pipe (i.e., 2×1 =2 in.), then the bend would consume the first 2 in. 608 of the middle segment 610 of line 604. Similarly, the next 90° bend would consume the last 2 in. of middle segment 610. Thus, the distance between the end 612 of the first bend and the beginning 614 of the second bend is equal to the length of middle segment minus 4 in. The length of line segments consumed for bends of smaller angles can be calculated mathematically and/or derived empirically, and mapped to a mathematical algorithm for use in generating the bender driver data.

Figure 7:
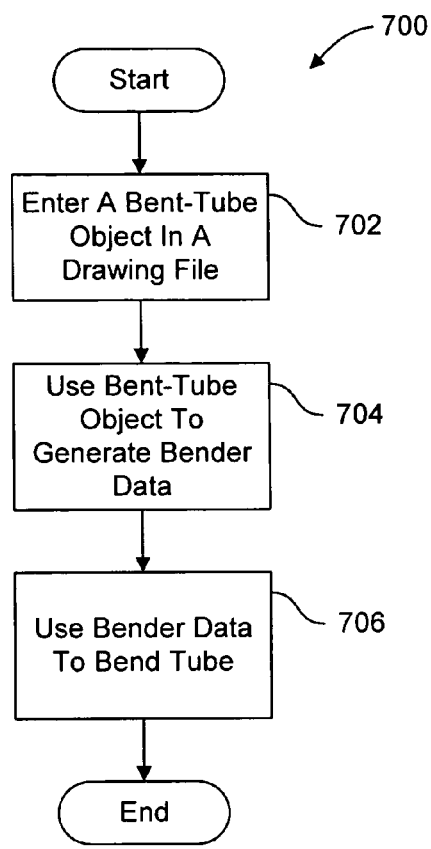
FIG. 7 is a flow chart summarizing an example method of using a bent-tube object to bend a tube.

FIG. 7 is a flow chart summarizing an example method 700 of using a bent-tube object to bend a tube, according to one embodiment of the present invention. In a first step 702, a designer enters a custom bent-tube object in a drawing file. Then, in a second step 704, the custom bent-tube object is used to generate bender driver data. Finally, in a third step 706, the bender driver data is used to bend the tube.

Figure 8:
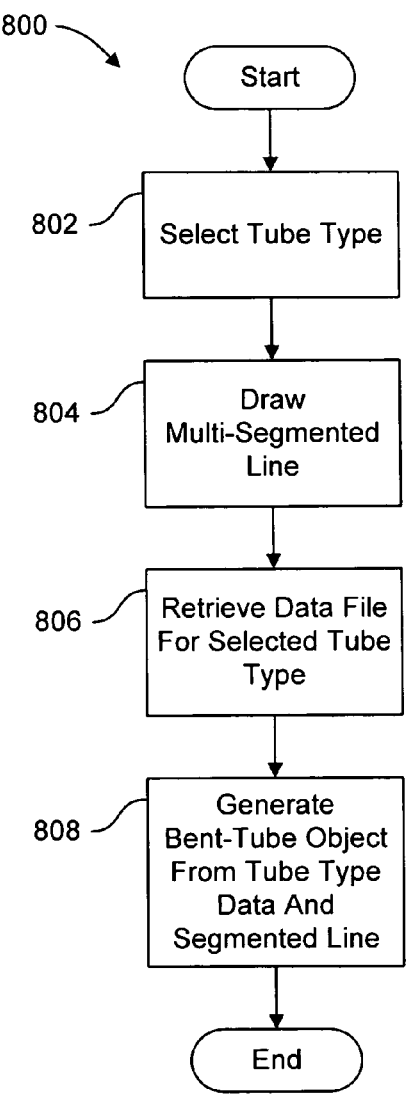
FIG. 8 is a flow chart summarizing an example method of performing the first step (enter a bent-tube object in a drawing file) in the method of FIG. 7.

FIG. 8 is a flow chart summarizing an example method 800 of performing first step 702 (enter a bent-tube object in a drawing file) of method 700. In a first step 802, a user selects a tube type. Next, in a second step 804, the user draws a multi-segmented line in a drawing file. Next, in a third step 806, a data file corresponding to the selected tube type is retrieved. Then, in a fourth step 808, the custom bent-tube object is generated from the tube type data and the segmented line.

Figure 9:
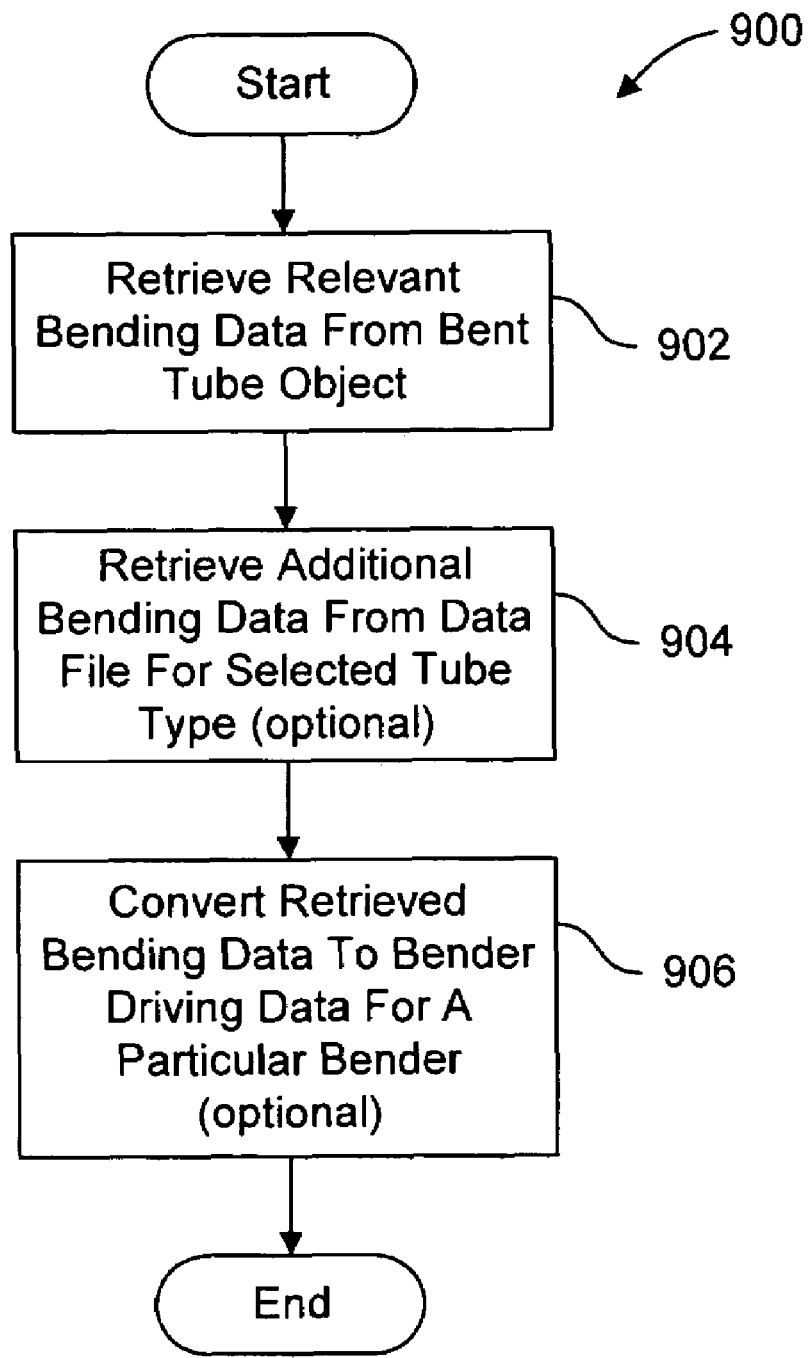
FIG. 9 is a flow chart summarizing an example method of performing the second step (use bent-tube object to generate bender data) in the method of FIG. 7.

FIG. 9 is a flow chart summarizing an example method 900 of performing second step 704 (use bent-tube object to generate bender data) of method 700. In a first step 902, relevant bending data is retrieved from the custom bent tube object. Next, in a second step 904, additional bending data is retrieved from the data file for the selected tube type. Second step 904 is unnecessary if all of the needed bending data is included in the custom bent-tube object. Finally, in a third step 906, the retrieved bending data is converted to bender driving data for a particular type of bending machine. Step 906 is also unnecessary if the bending data in the custom bent-tube object is in a form suitable for the desired type of bending machine.

The description of particular embodiments of the present invention is now complete. Many of the described features may be substituted, altered or omitted without departing from the scope of the invention. For example, alternate data structures may be substituted for the example data structures shown. As another example, rather than converting bender driver data from one particular type of bending machine to another, alternate bent-tube object files 122 can be provided for different bender types, so that a designer can select a particular bender when entering a custom bent-tube object 204. These and other deviations from the particular embodiments shown will be apparent to those skilled in the art, particularly in view of the foregoing disclosure.

We claim:

1. A method of using a bent-tube object in a drawing file, comprising:
    entering a bent-tube object in a drawing file with other types of drawing objects; and
    using said bent-tube object to generate bender driver data.

2. A method according to claim 1, wherein said step of entering said bent-tube object in said drawing file comprises:
    entering a multi-segmented line in said drawing file; and
    generating at least a portion of said bent-tube object based at least in part on lengths of and angles between the segments of said multi-segmented line.

3. A method according to claim 2, wherein said step of entering said bent-tube object includes selecting a tube type for said bent-tube object.

4. A method according to claim 3, wherein said step of generating said bent-tube object includes retrieving bent-tube object data based at least in part on said tube type.

5. A method according to claim 3, wherein said tube type is selected based at least in part on a tube diameter.

6. A method according to claim 1, wherein said step of using said bent-tube object to generate said bender driver data includes extracting at least a portion of said bender driver data from said bent-tube object.

7. A method according to claim 6, wherein said step of generating said bender driver data comprises:
    extracting a portion of said bender driver data from said bent-tube object; and
    retrieving another portion of said bender driver data from a separate bender driver data file.

8. A method according to claim 7, wherein said step of generating said bender driver data further comprises:
    selecting a bender type; and
    retrieving said another portion of said bender driver data based at least in part on said bender type.

9. A method according to claim 1, further comprising using said bender driver data to bend a tube.

10. A method according to claim 9, wherein said step of using said bender driver data to bend a tube includes converting said bender driver data from driver data for a first type of bender to driver data for a second type of bender.

11. An electronically readable media having code embodied therein for causing an electronic device to facilitate the steps of the method of claim 1.

12. An electronically readable media having code embodied therein for causing an electronic device to facilitate the steps of the method of claim 2.

13. An electronically readable media having code embodied therein for causing an electronic device to facilitate the steps of the method of claim 3.

14. An electronically readable media having code embodied therein for causing an electronic device to facilitate the steps of the method of claim 4.

15. An electronically readable media having code embodied therein for causing an electronic device to facilitate the steps of the method of claim 5.

16. An electronically readable media having code embodied therein for causing an electronic device to facilitate the steps of the method of claim 6.

17. An electronically readable media having code embodied therein for causing an electronic device to facilitate the steps of the method of claim 7.

18. An electronically readable media having code embodied therein for causing an electronic device to facilitate the steps of the method of claim 8.

19. An electronically readable media having code embodied therein for causing an electronic device to facilitate the steps of the method of claim 9.

20. An electronically readable media having code embodied therein for causing an electronic device to facilitate the steps of the method of claim 10.

21. A system for using a bent-tube object in a drawing file, said system comprising:
    an object manager responsive to input from a user and operative to generate a bent-tube object; and
    a drawing engine responsive to said object manager and operative to enter said bent-tube object in a drawing file including other types of drawing objects; and
    an extraction module operative to generate bender driver data from said bent tube object.

22. A system according to claim 21, wherein said object manager responsive to a multi-segmented line input by a user is operative to generate said bent-tube object based at least in part on lengths of and angles between the segments of said multi-segmented line.

23. A system according to claim 22, wherein said object manager is further responsive to a user selected tube type in generating said bent-tube object.

24. A system according to claim 23, wherein said object manager responsive to said user selected tube type is further operative to retrieve bent-tube object data based at least in part on said tube type, and to include at least a portion of said bent-tube object data in said bent-tube object.

25. A system according to claim 23, wherein said selected tube type is based at least in part on a tube diameter.

26. A system according to claim 21, wherein said extraction module and said drawing engine are located on separate machines.

27. A system according to claim 21, wherein said extraction module is operative to generate said bender driver data by generating a portion of said bender data from said bent-tube object, and to retrieve another portion of said bender driver data from a separate data file.

28. A system according to claim 27, wherein said extraction module is operative to retrieve said another portion of said bender driver data based at least in part on a selected bender type.

29. A system according to claim 21, further comprising a transfer media operative to communicate said bender driver data to a tube bender.

30. A system according to claim 21, further comprising a data converter responsive to indicia of a selected bender type, and operative to convert said bender driver data to bender driver data compatible with said selected bender type.

31. A system for using a bent-tube object in a drawing file, said system comprising:
    a drawing file including a plurality of bent-tube objects and objects of another type; and
    means for generating bender driver data from a selected one of said bent-tube objects.

32. A system according to claim 31, further comprising means for creating said bent-tube object in said drawing file.

33. A computer-readable medium having stored thereon a data structure comprising:
    a first field containing data representing a graphical image of a bent tube;
    a second field containing data representing a type of tube to be bent to form said bent tube; and
    a third field containing data for driving a tube bender to bend said bent tube.

34. A computer-readable medium according to claim 33, wherein said data structure further comprises:
    a fourth field containing data representing the length of a first line segment;
    a fifth field containing data representing the length of a second line segment; and
    a sixth field containing data representing an angle between said first line segment and said second line segment.

35. A computer-readable medium according to claim 34, wherein said sixth field of said data structure includes:
    a first sub-field containing data representing an absolute angle of said first line segment; and
    a second sub-field containing data representing an absolute angle of said second line segment.

36. A computer-readable medium according to claim 33, wherein said third field of said data structure includes a link to a data file containing data for driving a tube bender.

37. The method of claim 1, further comprising entering a plurality of bent-tube objects in said drawing file.

38. An electronically readable media having code embodied therein for causing an electronic device to facilitate the steps of the method of claim 37.

39. A system according to claim 21, wherein said drawing file includes a plurality of bent-tube objects.

* * * * *